(12) United States Patent
Mase et al.

(10) Patent No.: US 7,955,461 B2
(45) Date of Patent: Jun. 7, 2011

(54) METHOD FOR MANUFACTURING A THREE-DIMENSIONAL FORMING PORTION

(75) Inventors: Atsushi Mase, Nagoya (JP); Hidehiko Tanaka, Nagoya (JP); Hideki Shimizu, Oobu (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/556,033

(22) Filed: Sep. 9, 2009

(65) Prior Publication Data

US 2010/0065189 A1 Mar. 18, 2010

(30) Foreign Application Priority Data

Sep. 12, 2008 (JP) ................... 2008-234607

(51) Int. Cl.
*C03B 29/00* (2006.01)
*B29C 65/00* (2006.01)
*B29C 45/14* (2006.01)
*B28B 1/00* (2006.01)

(52) U.S. Cl. ............... 156/89.11; 156/285; 264/259; 264/642

(58) Field of Classification Search ............ 264/86, 264/87, 109, 110, 111, 112, 248, 250, 259, 264/263, 319, 642; 156/89.11
See application file for complete search history.

(56) References Cited

U.S. PATENT DOCUMENTS

| | | | |
|---|---|---|---|
| 5,296,175 A * | 3/1994 | Iwasaki et al. ............. 264/86 |
| 5,682,018 A * | 10/1997 | Wen et al. .................. 174/257 |
| 6,023,130 A * | 2/2000 | Sakasegawa et al. ...... 313/582 |
| 6,352,763 B1 * | 3/2002 | Dillon et al. ............... 428/325 |
| 6,450,850 B1 * | 9/2002 | Nunomura .................. 445/24 |
| 6,458,298 B1 * | 10/2002 | Awazu et al. .............. 264/40.1 |
| 6,595,232 B2 * | 7/2003 | Guzman et al. ......... 137/15.01 |
| 7,288,013 B2 * | 10/2007 | Yokoyama et al. ......... 445/23 |
| 2004/0152580 A1 * | 8/2004 | Marques .................... 501/66 |
| 2005/0016258 A1 | 1/2005 | Suzuki et al. |
| 2007/0278955 A1 * | 12/2007 | Kusuma et al. ............ 313/582 |

FOREIGN PATENT DOCUMENTS

| | | |
|---|---|---|
| JP | 62-001504 A1 | 1/1987 |
| JP | 03-254857 A1 | 11/1991 |
| JP | 04-029802 A1 | 1/1992 |
| JP | 8-155935 | 6/1996 |
| JP | 09-300617 | 11/1997 |
| JP | 2000-079686 | 3/2000 |
| JP | 2003-100609 | 4/2003 |
| JP | 2004-190653 | 7/2004 |
| JP | 2005-285421 | 10/2005 |
| JP | 2005-331489 A1 | 12/2005 |
| JP | 2006-237312 | 9/2006 |

* cited by examiner

*Primary Examiner* — Philip C Tucker
*Assistant Examiner* — Alex Efta
(74) *Attorney, Agent, or Firm* — Burr & Brown

(57) ABSTRACT

A mold having concave portions in a predetermined 3-D shape is prepared. A slurry is filled into the concave portions and the mold storing the slurry is then placed on an upper surface of a ceramic green sheet. A pressure inside the sheet is lowered through a pipe and a sintered porous metal support with the green sheet being heated by a hot plate. Accordingly, a solvent in the slurry is permeated into the fine pores of the green sheet and evaporated, thereby drying the 3-D forming portion without deformation.

9 Claims, 17 Drawing Sheets

METHOD FOR MANUFACTURING A THREE-DIMENSIONAL FORMING PORTION

TECHNICAL FIELD OF THE INVENTION

The present invention relates to a method for forming a three-dimensional forming portion having a predetermined shape, on a substrate with using "a porous substrate through which gases can pass" which, for instance, is a ceramic green sheet and the like, and a slurry including particles of a main raw material, a solvent, and an organic material.

BACKGROUND OF THE INVENTION

Conventionally, a ceramic laminated body having a hollow portion (a hollow space) in its inside has been widely known, the hollow portion being "a flow channel, a pressurizing chamber, and the like". Such a ceramic laminated body is used in wide areas, serving as, for instance, "an actuator for injecting fluid" such as an actuator of an inkjet printer and a fuel injection device, a Solid Oxide Fuel Cell (SOFC), a switching device, and a sensor, etc.

Typically, this kind of ceramic laminated body is manufactured through processes described below (see, for example, Japanese Patent Application Laid-Open (kokai) No. 2004-190653 (paragraph 0047 and FIG. 5), Japanese Patent Application Laid-Open (kokai) No. 2005-285421 (paragraphs 0464-0472, and FIG. 32,), and Japanese Patent Application Laid-Open (kokai) No. H08-155935 (paragraph 0004)).

(1) A window section or window sections are formed in a ceramic green sheet by punching through (out) the sheet with "a tool punch and a die". Side surfaces (fracture surfaces) of the window section will later become side surfaces of the hollow portion.
(2) The ceramic green sheet having the window section and two ceramic green sheets, each having no window section, are laminated in such a manner that the ceramic green sheet having the window section is sandwiched between the two ceramic green sheets each of which has no window section.
(3) The laminated ceramic green sheets are fired (sintered) and integrated.

SUMMARY OF THE INVENTION

However, according to the punching through process with using a tool punch and a die, the window section is formed by fracturing or tearing. Therefore, a large force is applied to the ceramic green sheet, when it is punched through. As a result, a portion close to the window section and the fracture surfaces of the window section may be deformed, the fracture surfaces may become rough, or a crack and a burr may be created at the punched-through portion, when the punch-through-pitch (distance between one window section and another window section adjacent to the one window section) is small or when a thickness of the ceramic green sheet is large, etc. The deformation, the burr, or the crack and the like have more adverse effects on a shape accuracy of the hollow portion, as the hollow portion becomes more miniaturized. Furthermore, since "the tool punch and the die" are required to be hard enough to bear the punching through process, they must be made of materials having high hardness. It is difficult to make "the tool punch and the die" which are very small from the materials having high hardness. Thus, there is a limit for miniaturizing "the tool punch and the die".

In view of the above, the inventors have perceived, as a result of their study, that the problems caused by the punching through process can be avoided, when a small size three-dimensional portion (convex portion) is formed on a ceramic green sheet without using the punching through process, because the laminated body having "the ceramic green sheet having the window section" placed on "the ceramic green sheet serving as the substrate" has the same structure as a body having "the three-dimensional portion (convex portion) with a desired pattern" formed on "the ceramic green sheet serving as the substrate". Accordingly, one of objects of the present invention is to provide a method for manufacturing a three-dimensional forming portion by which "a three-dimensional forming portion (convex portion), having a desired shape such as fine patterns and the like" can be "formed easily with high precision" on one surface side of surfaces of a porous substrate, by taking advantage of a character of the porous substrate.

Specifically, in order to achieve the above-object, the method for forming a three-dimensional forming portion according to the present invention comprises a mold preparation step, a slurry preparation step, a substrate preparation step, a pre-dried three dimensional forming portion forming step, and a post-dried three dimensional forming portion forming step. It should be noted that performing the order of the steps, which will be described below in detail, can be changed as long as there is no inconsistency.

The mold preparation step is a step to prepare a mold having a concave portion formed on one surface side of the mold. The concave portion is formed along a predetermined shape in a front elevational view.

The slurry preparation step is a step to prepare "a slurry" including "particles of a main raw material", "a solvent (re-solvent) for the particles", and "an organic material".

The substrate preparation step is a step to prepare a porous substrate through which gases can pass. Typical examples of such porous substrates are a ceramic green sheet, a porous ceramic substrate, a porous film, a porous metal substrate (e.g., a sintered metal substrate), a catalytic carrier, a paper, a ceramic film formed on a base material, a metal electrode film, and so on. There is no limit on the substrate, as long as the substrate has gas permeability.

These steps above can be performed in any order.

The pre-dried three dimensional forming portion forming step is a step to place or set the mold on (or at) the one surface side of the porous substrate in such a manner that "the pre-dried three dimensional forming portion" of the slurry which has a shape along the predetermined shape is formed on (or at) the one surface side of the porous substrate by means of the concave portion of the mold. It should be noted that, within the present specification and the claims, "the one surface' side of the porous substrate" means "one side of the two surfaces of the porous substrate", and may mean, for instance, "an upper side (upper section side) of the porous substrate". Here, as described later, the mold may be placed on the one surface side of the porous substrate with the slurry being previously filled in the concave portion of the mold. Alternatively, the slurry may be filled into the concave portion of the mold by pushing the mold into the slurry which has previously been placed on the one surface side of the porous substrate. That is, the pre-dried three dimensional forming portion forming step is "a step to place the mold on the one surface side of the porous substrate under a state where the slurry is filled in the concave portion of the mold".

The post-dried three dimensional forming portion forming step is a step to have "the solvent included in the slurry" permeate into "fine pores of the porous substrate" while the mold is kept placed on the one surface side of the porous substrate so as to dry the pre-dried three dimensional forming portion in order to form "the post-dried three dimensional forming portion".

According to the steps above, the solvent included in "the slurry which forms the pre-dried three dimensional forming portion" is passed into and absorbed by the fine pores of the porous substrate, and is diffused (or is evaporated) from end faces of the porous substrate, the end faces being not closed. Therefore, "the dried (post-dried) three dimensional forming portion (the three dimensional forming portion capable of keeping its shape by itself)" which has the predetermined shape and whose main components are the particles of the raw material can be easily formed on the one surface side of the porous substrate. In this case, a large load is not applied to the porous substrate, unlike the punching through process with a tool punch and a die. Thus, the porous substrate hardly deforms. In addition, side surfaces of the three dimensional forming portion are not formed by fracturing or tearing. Thus, the side surfaces of the three dimensional forming portion do not become rough, and the burrs are not created. Furthermore, since the hardness of the mold used in the present method can be smaller than the hardness of the mold used in "the punching through process", "the concave portion having a minute pattern (shape)" can be easily formed. As a result, the shape of the three dimensional forming portion in an elevational front view can be easily miniaturized and the shape accuracy of the dried three dimensional forming portion is high.

The porous substrate may be a ceramic green sheet and the particles of the main raw material may be ceramic powders.

In this case, it is preferable that the method for forming a three-dimensional forming portion according to the present invention further comprise, a sintering (firing) step to sinter and integrate the porous substrate and the post-dried three dimensional forming portion (i.e., a pre-sintered intermediate structure including at least the porous substrate and the dried three dimensional forming portion), after the post-dried three dimensional forming portion forming step.

A ceramic green sheet is "a porous substrate through which gases can pass". Therefore, if the particles of the main raw material are "ceramic powders", "the three dimensional forming portion comprising the ceramic powders as the main raw material" having the desired "shape in a front elevational view" can be easily formed on the ceramic green sheet. By sintering (firing) "the intermediate structure including the ceramic green sheet and the three dimensional forming portion", "a final structure made of ceramic" including the dense three dimensional forming portion having the desired shape in a front elevational view" on "the dense ceramic substrate" can be easily manufactured. Further, as described later, by placing "another ceramic green sheet" on the three dimensional forming portion of the intermediate structure" and by sintering (firing) them together to integrate (unite) them, "a dense ceramic structure including a hollow portion having the desired shape" can be easily manufactured.

In addition, in this case, it is preferable that "the particles from which the ceramic green sheet is formed" and "the particles of the main raw material (i.e., the ceramic powders) be the same kind of ceramic.

With the above feature, a shrinkage degree of "the porous substrate" and a shrinkage degree of "the pre-sintered three dimensional forming portion (the post-dried three dimensional forming portion)" can be closer to each other, when they are sintered (fired) during the sintering step. Thus, deformations of the both caused by sintering can be smaller. As a result, "the ceramic structure" having a desired shape without cracks and so on can be easily manufactured.

Furthermore, if the porous substrate is the ceramic green sheet, and the particles of the main raw material are the ceramic powders, it is preferable that the method for forming a three-dimensional forming portion comprise;

a laminating step to form a pre-sintered structure having a hollow portion, after the post-dried three dimensional forming portion forming step and before the sintering step, by placing another ceramic green sheet on the post-dried three dimensional forming portion (on the other side of the post-dried three dimensional forming portion, i.e., on a side of the post-dried three dimensional forming portion, the side being opposite to the porous substrate); and the sintering step be a step to sinter (fire) the pre-sintered structure to be integrated (united).

With the above feature, the ceramic structure having the miniaturized hollow portion (a flow channel or a pressurizing chamber, and the like) can easily be manufactured. Notably, it is preferable that the another ceramic green sheet be formed from the same kind of ceramic as "the ceramic powders from which the particles of the raw material of the slurry is formed".

In the method for forming a three-dimensional forming portion according to the present invention, it is preferable that the porous substrate be a ceramic green sheet, and the particles of the raw material be made of an electrical conducting material, a mixture of the electrical conducting material and the ceramic powders, and so on.

With the feature above, a pattern of the conductor, a pattern of the mixture of the conductor and the ceramic powders, and so on, can easily be formed on the ceramic substrate. That is, according to the present invention, with using pasty materials including particles, a pattern mainly including the particles can easily be formed on the ceramic substrate.

Furthermore, it is preferable that, the pre-dried three dimensional forming portion forming step include a slurry filling step of filling the slurry into the concave portion of the mold, and be a step of forming "the pre-dried three dimensional forming portion" by placing the mold, after the slurry is filled into the concave portion, in such a manner that "a side at which the concave portion is formed (i.e., a concave forming side)" opposes to "the one surface side of the porous substrate (i.e., the plane of the one surface side)";

the post-dried three dimensional forming portion forming step include a demolding step to release the mold from "the post-dried three dimensional forming portion".

At this time, a convex portion forming the concave portion of the mold (i.e., an end surface of the concave forming side) may contact the one surface side of surfaces of the porous substrate, or may be slightly apart from the one surface side of surfaces of the porous substrate.

With the feature above, the three dimensional forming portion can be formed without applying a large load (force) to the porous substrate such as the ceramic green sheet. Therefore, a deformation of the porous substrate can be avoided. In addition, since it is not necessary to apply a large load to the mold, the mold is not required to have extremely high hardness and extremely high durability. As a result, a limitation in choosing materials for the mold can become smaller. Further, since the mold can be formed from materials having relatively lower hardness, the miniaturized pattern can easily be formed on the mold.

Alternatively, the pre-dried three dimensional forming portion forming step may include a pressing step to form the slurry on the one surface side of surfaces of the porous substrate (i.e., the plane of the one surface side) in the form of layer, to place the mold in such a manner that a side at which said concave portion is formed opposes to the one surface side of said porous substrate, and thereafter to press the mold toward the porous substrate";

the post-dried three dimensional forming portion forming step may include a demolding step to release the mold from "the post-dried three dimensional forming portion".

At this time, the end surface of the concave forming side may contact the one surface side of surfaces of the porous substrate, or may be slightly apart from the one surface side of surfaces of the porous substrate.

In the case above, unlike the case where a plate having relatively high hardness such as the ceramic green sheet is punched through, the three dimensional forming portion can be formed only by molding "the deformable slurry" with "the mold having the concave portion". Thus, since it is not necessary to "apply a large load to the mold" in the pressing step, the mold is not required to have extremely high hardness and extremely high durability. As a result, a limitation in choosing materials for the mold can become smaller. Further, since the mold can be formed from materials having relatively lower hardness, the miniaturized pattern can easily be formed on the mold. In addition, the deformation of the porous substrate can be minimized.

Furthermore, as another alternative, the pre-dried three dimensional forming portion forming step may include, a concave portion slurry filling step of filling the slurry into the concave portion of the mold; and a slurry layer forming step to form the slurry on the one surface of surfaces of the porous substrate in the form of layer;

and may be a step to form the pre-dried three dimensional forming portion, after the slurry is filled into the concave portion and the slurry is formed on the one surface side of surfaces of the porous substrate in the form of layer, by placing the mold in such a manner that the side at which the concave portion is formed opposes to the one surface side of surfaces of the porous substrate; and the post-dried three dimensional forming portion forming step may include a demolding step to release the mold from the post-dried three dimensional forming portion.

At this time, the end surface of the concave forming side may contact the one surface side of surfaces of the porous substrate, or may be slightly apart from the one surface side of surfaces of the porous substrate.

With the feature above, the slurry can be filled into the concave portion of the mold more certainly. It should be noted that, after the mold is placed in such a manner that the side at which the concave portion is formed opposes to the one surface side of surfaces of the porous substrate, the mold may be pressed toward the porous substrate.

In the method for forming a three-dimensional forming portion according to the present invention, it is preferable that the post-dried three dimensional forming portion forming step include assisting the solvent in permeating into the fine pores of the porous substrate by maintaining an inside of the porous substrate at a pressure lower than the atmospheric pressure (i.e., by vacuuming).

With the feature above, "the solvent included in the slurry" is sucked into the fine pores of the porous substrate, and thus, the solvent can be permeated into the fine pores of the porous substrate in a short time. As a result, a time required for the post-dried three dimensional forming portion forming step can be shortened. It should be noted that, as long as the solvent is absorbed into the fine pores of the porous substrate, there is no limit on a ratio of an area of the three dimensional forming portion (the three dimensional forming portion forming area) to an area of the one surface side of surfaces of the porous substrate (an area of the side where the three dimensional forming portion is formed). Thus, for example, when the ratio is designed to be larger, the usable area can become larger and thus a great number of products can be manufactured from a single substrate. That is, the present invention can provide the method for manufacturing the three dimensional forming portion which has high productivity.

Yet further, in the method for forming a three-dimensional forming portion according to the present invention, it is preferable that the post-dried three dimensional forming portion forming step include assisting in drying the three-dimensional forming portion by evaporating the solvent through heating at least one portion of the porous substrate. It should be noted that a shrinkage amount of the three-dimensional forming portion while it is being dried can be made smaller by adjusting a concentration (or density) of the solvent appropriately.

With the feature above, it is possible to evaporate the solvent permeated into the fine pores of the porous substrate in a short time. As a result, a time required for the post-dried three dimensional forming portion forming step can be shortened. Further, if the porous substrate is a ceramic green sheet, it is possible to raise a temperature of the ceramic green sheet above the glass-transition temperature by heating the ceramic green sheet. In such a case, the ceramic green sheet is softened, and thus an adherence between the ceramic green sheet and the slurry can be increased.

DETAILED DESCRIPTION OF THE INVENTION

Embodiments of "a manufacturing method for manufacturing a three-dimensional forming portion" according to the present invention will next be described with reference to the drawings. It should be noted that performing order of the following steps can be changed as long as there is no inconsistency.

The manufacturing methods described here are suitable for manufacturing "a ceramic laminated body" having a hollow portion (a hollow space) in its inside, the hollow portion being, for instance, "a flow channel, a pressurizing chamber, and so on". Such a ceramic laminated body is used for, for instance, "an actuator for injecting fluid" such as an actuator of an inkjet printer and a fuel injection device, a Solid Oxide Fuel Cell (SOFC), a switching device, and a sensor, etc. It should be noted that the method for manufacturing a three-dimensional forming portion according to the present invention is also suitable for manufacturing a device having "a three dimensional forming portion which follow a predetermined pattern" on a substrate. Such a device may be a wiring substrate, for instance. Furthermore, the method for manufacturing a three-dimensional forming portion according to the present invention is preferably used when manufacturing a ceramic laminated substrate such as a LTCC substrate (Low-Temperature Co-fired Ceramics) and a HTCC substrate (High-Temperature Co-fired Ceramics). The LTCC substrate and the HTCC substrate are ceramic laminated substrates used in electrical devices such as a dielectric laminated filter, a multiple laminated dielectric antenna, a dielectric coupler, a dielectric complex module, and a hybrid IC. In addition, according to the method for manufacturing a three-dimensional forming portion of the present invention, as described later, a structure having a plurality of concave portions (holes) which are arranged at predetermined positions and a structure having a plurality of convex portions (dots) which are arranged at predetermined positions can easily be manufactured, as well.

First Embodiment (A Mold Preparation Step)

Figure 1:
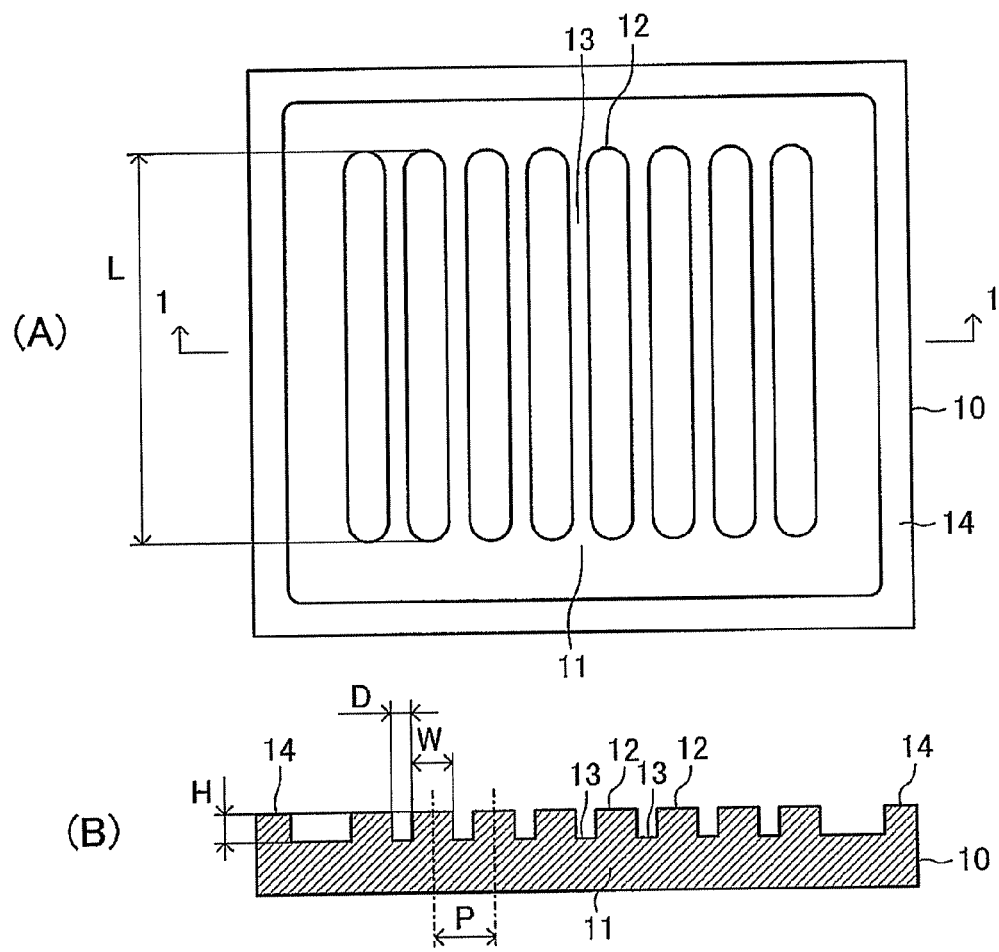
FIG. 1 shows a mold used in a method for manufacturing a three dimensional forming portion according to a first embodiment of the present invention, (A) is a front view of the mold and (B) is a cross sectional view of the mold.

First, a mold (a pressing mold, a stamper) 10 shown in FIG. 1 is prepared. (A) of FIG. 1 is a front view of the mold 10. (B) of FIG. 1 is a cross sectional view of the mold 10 cut by a plane along a line 1-1 in (A) of FIG. 1. The mold 10 is made of a dense material such as a metal (e.g., a cemented carbide or a typical alloy). The mold 10 comprises a plurality of convex portions 12 which project or protrude from a flat plate-like base portion 11. The convex portion 12 has a substantially rectangular parallelepiped shape. The plurality of the convex portions 12 are arranged in such a manner that their longitudinal directions are parallel to each other. Accordingly, a concave portion 13 is formed between a pair of the convex portions 12, 12 which are adjacent to each other. The concave portions 13 form a pattern of "convex portions which will be eventually formed on a substrate as three dimensional forming portions". That is, the mold 10 has "the concave portion which follows a predetermined pattern (a predetermined shape) in a front view" on its one side (concave portion forming side).

It is preferable that surfaces of the convex portions 12 and concave portions 13 of the mold 10 be coated with a mold release agent. In such a case, in order to improve adherence between the mold 10 and the mold release agent, it is preferable that the mold 10 be cleaned before the mold release agent is applied to the mold 10. The cleaning can be performed by an ultrasonic cleaning, an acid cleaning, a UV ozone cleaning, and so on. Preferably, a surface of the mold 10 to be coated with the mold release agent (i.e. a cleaned surface) is cleaned at the atomic level. One of examples of the mold release agent is a fluorine series mold release agent such as "OPTOOL DSX" made by DAIKIN INDUSTRIES, Ltd. The mold release agent may be a silicon series mold release agent or a wax release agent. The mold release agent is applied by dipping, spraying, brushing and so on, and thereafter, is formed in the form of a film on the surface of the mold 10 through a drying step and a washing step. The surface of the mold may be coated by an inorganic film treatment with a DLC (Diamond Like Carbon) coating.

In the present example, a width W of the convex portion 12 is 50 μm, a height H of the convex portion 12 is 100 μm, and a distance P between centerlines of a pair of the convex portions 12, 12 adjacent to each other is 90 μm. Accordingly, a width D of the concave portion 13 is 40 μm. A length along a longitudinal direction of the convex portion 12 and the concave portion 13 is 870 μm. These dimensions and patterns are just exemplary and not limited to them. Preferably, the width W is between 10-80 μm, the height H is 0-200 μm (except 0 μm), and the P is 60-120 μm.

It should be noted that it is difficult to avoid burrs created at edge portion, a deformation of the substrate, cracks, and so on, according to the conventional "punching through process". Moreover, if a mechanical property of the substrate is not controlled, then it is difficult to stably form window portions having desired shapes. With these reasons, it is difficult to form "a window portion whose width D, width W and height H are 40 μm, 50 μm, and 100 μm, respectively" with high accuracy by "the punching through process" at present.

(A Slurry Preparation Step)

Subsequently, a slurry 20 is prepared (see FIG. 2). The slurry 20 consists of ceramic powders serving as particles of a main raw material, a solvent for the ceramic powders, an organic material, and a plasticizing agent. A ratio by weight of those is, for instance, the ceramic powder: the solvent: the organic material: the plasticizing agent =100: 50-100: 5-10: 2-5. In the present example, the ceramic powders are made of alumina, zirconia, and so on. The solvent is made of toluene, isopropyl alcohol, and so on. The organic material is made of polyvinyl butyral. The plasticizing agent is made of phthalate series butyl. Each of the materials and the weight ratio are not limited thereto. Note that it is preferable that a viscosity of the slurry be 0.1-100 Pa·sec.

(A Substrate Preparation Step)

Figure 2:
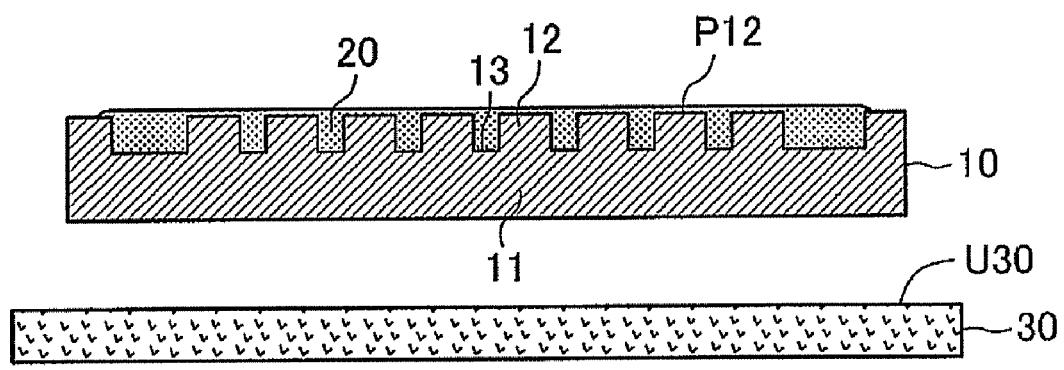
FIG. 2 is a figure to explain a pre-dried three dimensional forming portion forming step in the method for manufacturing a three dimensional forming portion according to the first embodiment of the present invention.

Meanwhile, a ceramic green sheet 30 shown in FIG. 2 is prepared. The ceramic green sheet 30 is made of "a material forming the slurry 20 from which the solvent is removed". That is, the ceramic green sheet 30 is made of the ceramic powders, the organic material, and the plasticizing agent that are the same as those used for the slurry 20. A ratio by weight of those is, for instance, the ceramic powder: the organic material: the plasticizing agent=100:7-8:3-4. The ceramic green sheet 30 is formed according to well-known methods. For instance, the ceramic green sheet 30 is manufactured by making the slurry 20, defoaming the slurry, and thereafter, being formed with well-known sheet forming techniques such as a doctor blade method and a reverse roll coater method.

Figure 3:
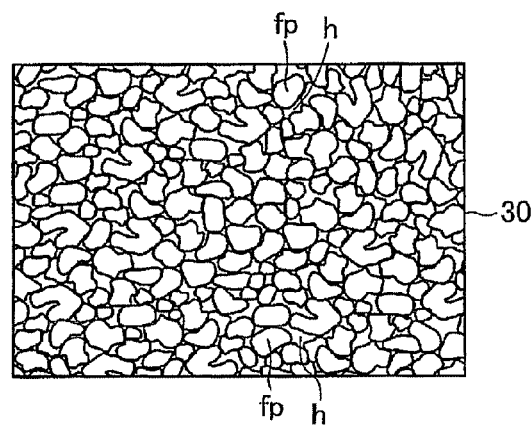
FIG. 3 is a cross sectional view of a ceramic green sheet shown in FIG. 2.

FIG. 3 is a cross sectional view of the ceramic green sheet 30. As shown, the ceramic green sheet 30 has a great number of fine pores h among particles fp. Thus, the ceramic green sheet 30 is "a porous substrate through which gasses (fluids) can pass". It should be noted that a diameter of the pore (an averaged diameter of the pores) of the ceramic green sheet 30 is smaller than a particle diameter of the ceramic powders (an averaged particle diameter), but is obviously larger than a diameter of a molecule of the solvent. A porosity of the ceramic green sheet 30 is 5-30 vol %, preferably 12-23 vol %. In this case, a thickness of the ceramic green sheet 30 is preferably 10-500 μm. It is preferable that the averaged particle diameter of the ceramic powder used here be 0.2-1.0 μm.

(A Pre-Dried Three Dimensional Forming Portion Forming Step)

Next, as shown in FIG. 2, the slurry 20 is filled into the concave portions 13 of the mold 10 by applying. This step is called "a slurry filling (or applying) step, or a slurry filling step of filling a slurry into concave portion". The slurry 20 may be filled into the concave portions 13 by any appropriate method other than applying (e.g., dipping, squeegeeing, brushing, and filling with a dispenser, etc.). Further, in order to improve a filling rate, ultrasonic vibration may be applied to the mold 10 when filling the slurry 20 into the concave portions 13, or air bubbles remaining in the mold 10 may be removed by an vacuum deaeration.

Figure 4:
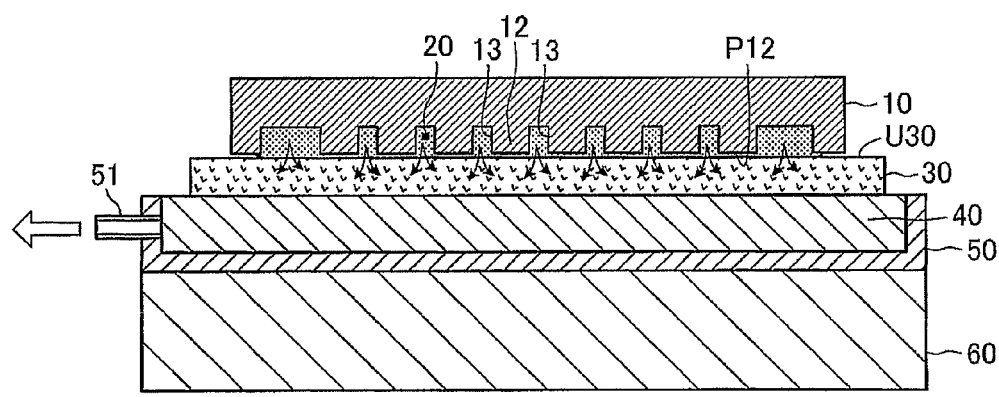
FIG. 4 is a figure to explain the pre-dried three dimensional forming portion forming step and a post-dried three dimensional forming portion forming step in the method for manufacturing a three dimensional forming portion according to the first embodiment of the present invention.

Subsequently, as shown in FIG. 4, the mold 10 is placed or set at (on) an upper side (i.e., one side of surfaces) of the ceramic green sheet 30 (i.e., the porous substrate) in such a manner that "the side (plane) at which the concave portions 13 are formed, of the mold 10" opposes to "an upper side (one surface side) of the ceramic green sheet (the porous substrate) 30". As a result, "the pre-dried three dimensional forming portions (pre-dried convex portions)", which is a three dimensional forming portion made of the slurry which has not yet been dried, is formed on the ceramic green sheet 30. It should be noted that end faces P12 of the convex portions 12 which form the concave portions 13 of the mold 10 (i.e., "an end surface P12 of the concave portion forming side" that are end faces at the side at which the concave portions 13 are formed" of the mold 10) contacts an upper side (surface) U30 of the ceramic green sheet 30 in the present example. However, the mold 10 may be placed in such a manner that the end surface P12 of concave portion forming side is slightly apart from "the upper side U30 of the ceramic green sheet 30" by a slight distance (e.g., 0-0.5 mm). It is preferable to improve accuracy in a position at which the three dimensional forming portion is formed by using reference holes, alignment marks, and so on, when placing the mold 10 onto the ceramic green sheet 30.

That is, this pre-dried three dimensional forming portion forming step is a step wherein the mold 10 is placed or set on the one surface side of the ceramic green sheet 30 in such a manner that "the pre-dried three dimensional forming portion" which is made of the slurry 20 and has a shape along "a predetermined pattern defined by the concave portions 13" is formed by the concave portions 13 of the mold 10 on the one surface side of the ceramic green sheet 30 (in this case, above the sheet 30 or an upper side of the sheet 30) which is the porous substrate.

The ceramic green sheet 30 is placed on an upper side of a porous sintered metal 40 (i.e., on one of sides of the sintered metal 40). The sintered metal 40 is set in a casing 50 which is made of "a dense and thermally conductive material". That is, outer circumferences except its upper surface (i.e., side surfaces and a bottom surface) of the sintered metal 40 are covered by the casing 50. A communicating pipe 51 for suction is inserted at and through a side portion of the casing 50. The communicating pipe 51 for suction is connected to a vacuum pump which is not shown.

The casing 50 is placed on a hot plate (a heating apparatus) 60. The hot plate 60 generates heat when energized to heat the bottom surface of the ceramic green sheet 30 (i.e., the other surface, or one portion of the ceramic green sheet 30) through the casing 50 and the sintered metal 40.

(A Post-Dried Three Dimensional Forming Portion Forming Step)

Subsequently, in a post-dried three dimensional forming portion forming step, as shown by arrows in FIG. 4, the solvent included in "the slurry 20 kept in the concave portions 13 of the mold 10" is permeated into (or passed through) the fine pores of the ceramic green sheet 30 by "its own weight and capillarity". The post-dried three dimensional forming portion forming step is continued for a predetermined time period (e.g., 5 minutes). That is, the post-dried three dimensional forming portion forming step is a step to leave "the mold 10 storing the slurry 20 in the concave portions 13" for the predetermine time period as it is in "a state where the mold 10 is placed and fixed on the porous substrate (the ceramic green sheet 30) which is not moved" in such a manner that open ends of the concave portions 13 oppose to the porous substrate 30. Thus, the slurry 20 is dried to be solidified. As a result, "a post-dried three dimensional forming portion" is formed within the concave portions 13 and on the one surface side of (or above) the ceramic green sheet 30. It should be noted that the post-dried three dimensional forming portion forming step may be a step to form "the post-dried three dimensional forming portion" by placing "the mold 10 storing the slurry 20 in the concave portions 13" on the porous substrate (the ceramic green sheet 30) which is being moved in such a manner that open ends of the concave portions 13 oppose to the porous substrate 30.

Further, in the post-dried three dimensional forming portion forming step, the aforementioned vacuum pump is driven to thereby discharge gases existing in the ceramic green sheet 30 (see white frame arrow). Therefore, a pressure in the ceramic green sheet 30 becomes lower than the atmospheric pressure (e.g., lower than the atmospheric pressure by 80 kPa). Thus, the solvent included in the slurry 20 is permeated and sucked into (or passed through) the fine pores of the ceramic green sheet 30 efficiently. In such a case, a degree of vacuum (the pressure in the ceramic green sheet 30) is preferably 0 to −100 kPa, and more preferably −80 to −100 kPa.

Furthermore, in the post-dried three dimensional forming portion forming step, the hot plate 60 is energized. Therefore, a temperature of the ceramic green sheet 30 increases and thereby the solvent which has permeated into the fine pores can be easily evaporated (or diffused). As a result, the slurry is dried and becomes solidified within a much shorter time.

As described above, the post-dried three dimensional forming portion forming step is a step to dry "the pre-dried three dimensional forming portion (the slurry 20)" by having the solvent included in the slurry 20 permeate into the fine pores of the ceramic green sheet 30 which is the porous substrate while the mold 10 is kept placed at the one surface side (in this case, an upper surface) of the ceramic green sheet 30 so as to form "the post-dried three dimensional forming portion" within the concave portions 13.

It should be noted that lowering the pressure in the fine pores of the ceramic green sheet 30 by the vacuum pump is optional. Thus, the sintered metal 40 and the casing 50 may be replaced by a simple base. Moreover, heating the ceramic green sheet 30 by the hot plate 60 is also optional. Thus, the hot plate can be omitted. It should also be noted that the mold 10 with which the slurry 20 is filled is just placed on the ceramic green sheet 30, in the above example. In other words, no load (or no force) is applied to the mold 10.

Figure 5:
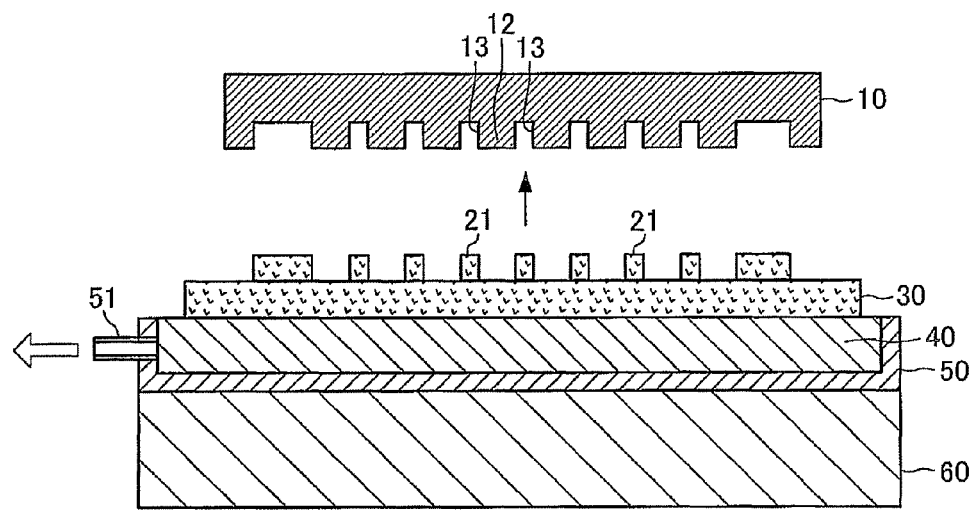
FIG. 5 is a figure to explain a demolding step included in the post-dried three dimensional forming portion forming step in the method for manufacturing a three dimensional forming portion according to the first embodiment of the present invention.

Thereafter, as shown in FIG. 5, when the slurry 20 has dried, and therefore, "the post-dried three dimensional forming portion 21" has been formed, "the ceramic green sheet 30 and the post-dried three dimensional forming portion 21" are cooled. Then, the mold 10 is released (removed) from "the ceramic green sheet 30 and the post-dried three dimensional forming portion 21". That is, a demolding step is performed.

In the demolding step, it is preferable that the vacuum pump be also driven so as to lower the pressure in the sintered metal 40. With this, it is possible to stably keep or hold the ceramic green sheet 30 by the sintered metal 40, when the mold 10 is released (when demolding). As a result, the ceramic green sheet 30 does not move upward, and thus, a deformation of the ceramic green sheet 30 and a deformation (breaking the pattern) of the post-dried three dimensional forming portion 21 can be avoided.

Further, the temperature of the ceramic green sheet 30 becomes higher than a glass-transition temperature by heating the hot plate 60 before the cooling step for demolding during the post-dried three dimensional forming portion forming step. Thus, the ceramic green sheet 30 is softened, and thus an adherence between the ceramic green sheet 30 and the slurry 20 can be increased. As a result, the deformation (breaking the pattern) of the post-dried three dimensional forming portion 21 during demolding can be avoided more certainly.

(A Laminating Step)

Figure 6:
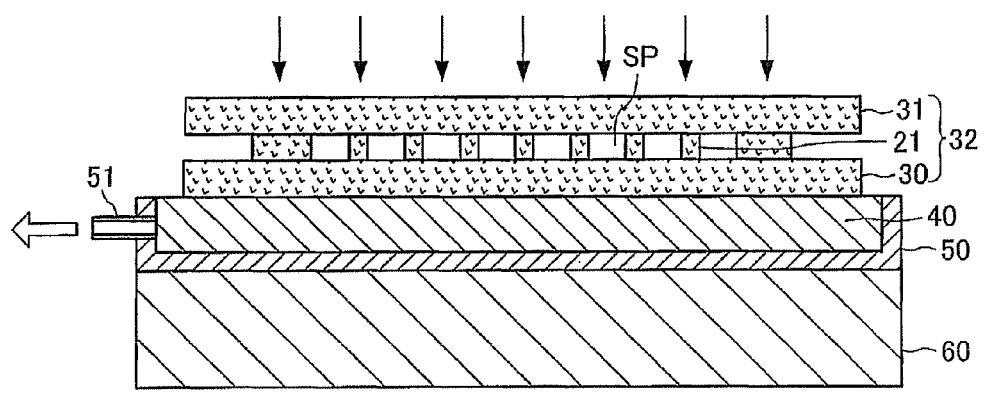
FIG. 6 is a figure to explain a laminating step in the method for manufacturing a three dimensional forming portion according to the first embodiment of the present invention.

Subsequently, as shown in FIG. 6, "another ceramic green sheet 31" is placed on the post-dried three dimensional forming portion 21. Thereafter, the ceramic green sheet 31 is thermally compressed to be bonded to the post-dried three dimensional forming portion 21. As a result, a pre-sintered structure 32 which comprises hollow portions SP is formed. It should be noted that this laminating step is optional. Additional processes, such as a laser beam machining and a process using a tool punch, may be applied to the post-dried three dimensional forming portion 21, before or after the ceramic green sheet 31 is laminated. Furthermore, a printing process, a cutting-dividing process, and so on may be performed after the ceramic green sheet 31 is laminated.

(A Sintering Step)

Subsequently, the pre-sintered structure 32 is heated to be sintered (fired). After sintering, additional processes such as a laser beam machining may be carried out on a post-sintered structure. Furthermore, a cutting-dividing process or another process may be performed. As a result, a ceramic structure having the hollow portions SP is manufactured. As described above, the laminating step is optional. Therefore, the sintering step may be said to be a step of sintering or firing to integrate or unite an intermediate structure including at least "the ceramic green sheet 30 serving as the porous substrate and the post-dried three dimensional forming portion 21", after the post-dried three dimensional forming portion forming step.

As described above, by the method for manufacturing a three dimensional forming portion according to the first embodiment of the present invention, the solvent included in "the slurry 20 forming the pre-dried three dimensional forming portion" permeates into (passing through/is absorbed by) the fine pores of the porous substrate (the ceramic green sheet 30) and diffuses (evaporates) from end faces of the porous substrate, the end faces being not closed. Therefore, "the dried three dimensional forming portion (the convex portions 21 capable of keeping its shape by itself)" which has the predetermined pattern (the predetermined shape in a front view) and whose main components are the particles of the raw material can be easily formed on the one surface side (in the example, the upper side) of the porous substrate.

The method for manufacturing a three dimensional forming portion does not include a punching through process using "a tool punch and a die". Therefore, a large load is not applied to the porous substrate. As a result, the porous substrate scarcely deforms. In addition, side surfaces of the three dimensional forming portion 21 are not formed by fracturing or tearing. Thus, the side surfaces of the three dimensional forming portion 21 do not become rough, and the burrs are not created. Furthermore, since the hardness of the mold 10 can be smaller than the hardness of "the mold used in the punching through process", "a minute pattern (shape)" can be easily formed on the mold 10. As a result, "the three dimensional forming portion 21 having a fine and desired pattern" can be easily formed on the one surface side (in the example, the upper side) of the porous substrate.

Furthermore, according to the present method for manufacturing a three dimensional forming portion, "the three dimensional forming portion 21 made of the ceramic powders serving as the main component" having the desired pattern can be easily formed on the ceramic green sheet 30. In addition, this "intermediate structure including the ceramic green sheet 30 and the three dimensional forming portion 21" is sintered (fired). Therefore, "the final structure made of ceramic" including "the dense three dimensional forming portion having the desired pattern" on "the dense ceramic substrate" can be easily manufactured. Moreover, in actuality, "a different ceramic green sheet 31" is placed on the three dimensional forming portion of the intermediate structure" in a step prior to the sintering step, and thereafter, they are sintered (fired) together. Accordingly, "the dense ceramic structure including the hollow portions having the desired shape" can be easily manufactured.

In addition, "the ceramic green sheet 30 which is the porous substrate" and "the pre-sintered three dimensional forming portion 21" are formed of the same kind of ceramic. Thus, a shrinkage degree of them can be closer to each other, when they are sintered and integrated. Therefore, deformations of the both caused by the sintering can be prevented and cracks can be avoided. As a result, the ceramic structure having the desired shape as designed can be easily manufactured.

It should be noted that "the mold 10 with which the slurry 20 is filled" may be pressed with "a predetermined pressing load toward the ceramic green sheet 30" while the mold 10 is placed on the ceramic green sheet 30, in the pre-dried three dimensional forming portion forming step. With this process, an adherence between the ceramic green sheet 30 and the slurry 20 can be increased. Notably, the pressing load is extremely smaller than a pressing load applied to a tool punch during the punching through process using "the tool punch and a die". As a result, a deformation (breaking the pattern) of the post-dried three dimensional forming portion 21 during demolding can be avoided more certainly.

<Comparison to a Directly Pressing Mold Method>

Figure 7:
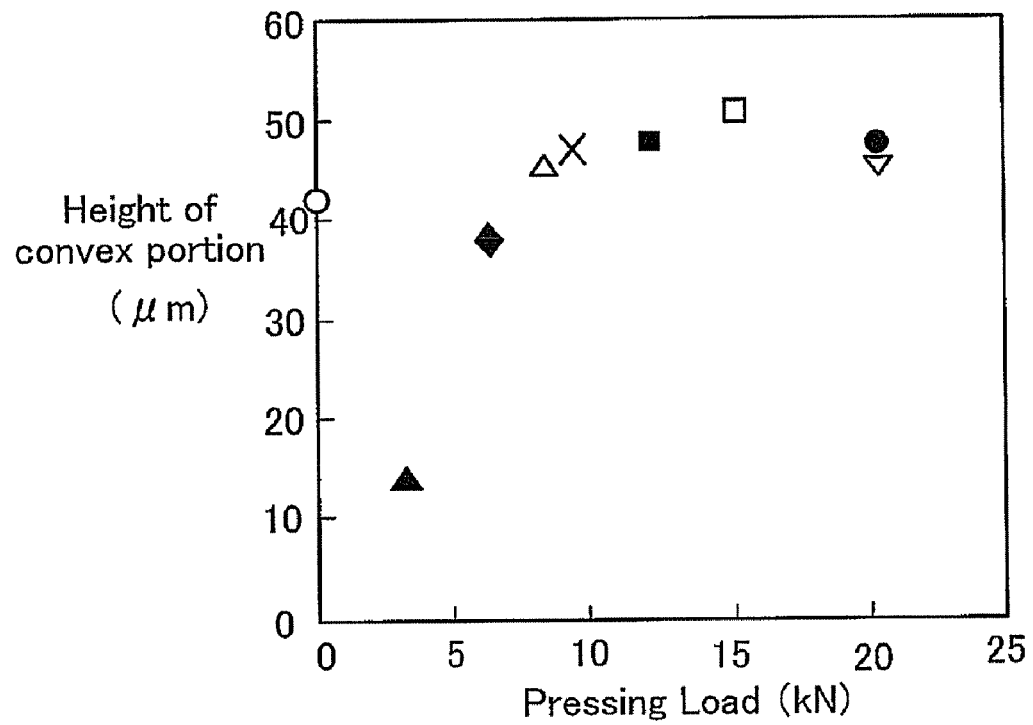
FIG. 7 is a figure showing an experimental result to confirm effects by the first embodiment of the present invention.

FIG. 7. is a graph showing a result of comparison experiment to compare the method for manufacturing a three-dimensional forming portion according to the first embodiment of the present invention (a reverse imprint method) with a directly pressing mold method (a direct imprint method). The directly pressing mold method is a method for forming a three dimensional forming portion by directly pressing a mold to a ceramic green sheet without using a slurry. Specifically, the directly pressing mold method comprises the following steps.

Step 1: The mold 10 shown in FIG. 1 is prepared in the mold preparation step (note that the hardness of the mold is greater than the mold 10 described above);

Step 2: The ceramic green sheet 30 is prepared in the substrate preparation step;

Step 3: The ceramic green sheet 30 is placed on a hot plate to be heated so that a temperature of the ceramic green sheet 30 (a temperature of S.G.) coincides with "each of temperatures shown in FIG. 7";

Step 4: The mold 10 is pressed to the ceramic green sheet 30 at "each of pressing loads shown in FIG. 7"; and Step 5: The mold 10 is released.

As is clear from FIG. 7, according to the method for manufacturing a three-dimensional forming portion of the present embodiment, three-dimensional forming portions having a height no less than 40 μm were formed without applying any load to the mold 10 at room temperature. To the contrary, according to the directly pressing mold method, any of three-dimensional forming portions each of which has a height no less than 40 μm were not formed unless the mold 10 was pressed, for instance, at about 7 kN (700 kgf) when a temperature of the ceramic green sheet 30 is 100° C. This result also leads to a conclusion that the method for manufacturing a three-dimensional forming portion of the present embodiment is an excellent method which scarcely causes a deformation of the ceramic green sheet 30 and which does not require the mold 10 to have high hardness.

Figure 8:
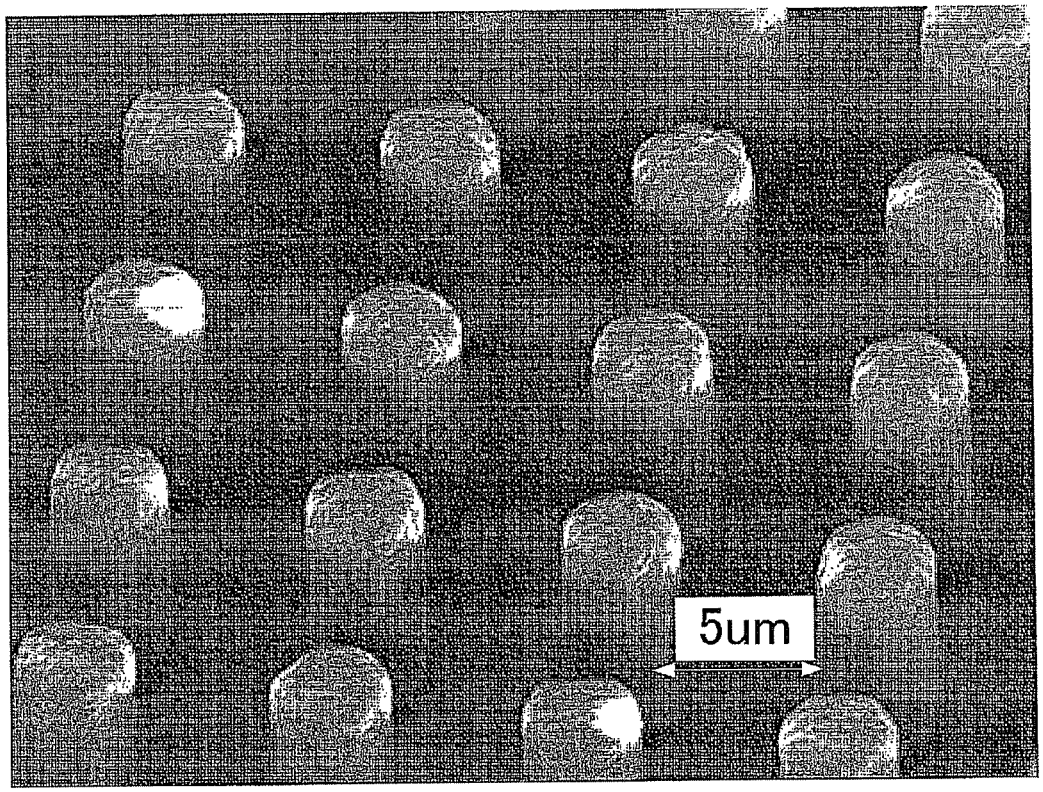
FIG. 8 is a photograph of a surface of "a structure having cylindrical convex portions (cylindrical three dimensional portions)" manufactured by the manufacturing method according to the first embodiment of the present invention.
Figure 9:
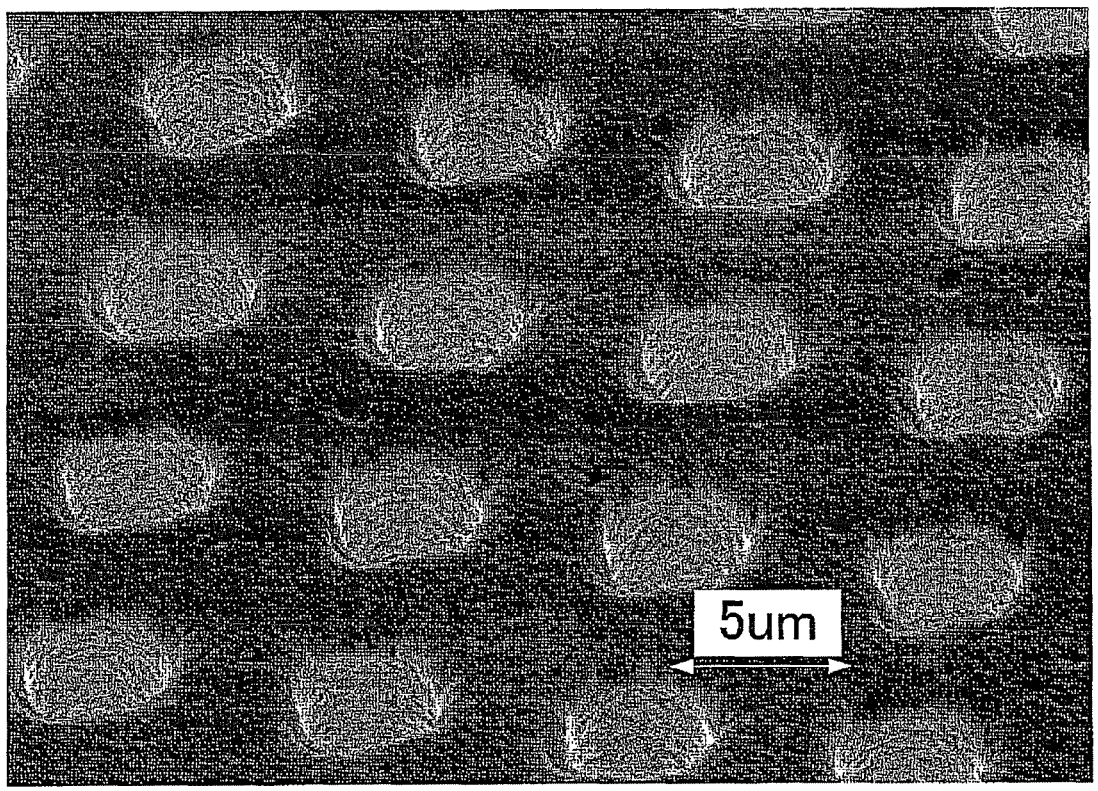
FIG. 9 is a photograph of a surface of "a structure having a three dimensional forming portion which forms cylindrical concave portions" manufactured by the manufacturing method according to the first embodiment of the present invention.
Figure 10:
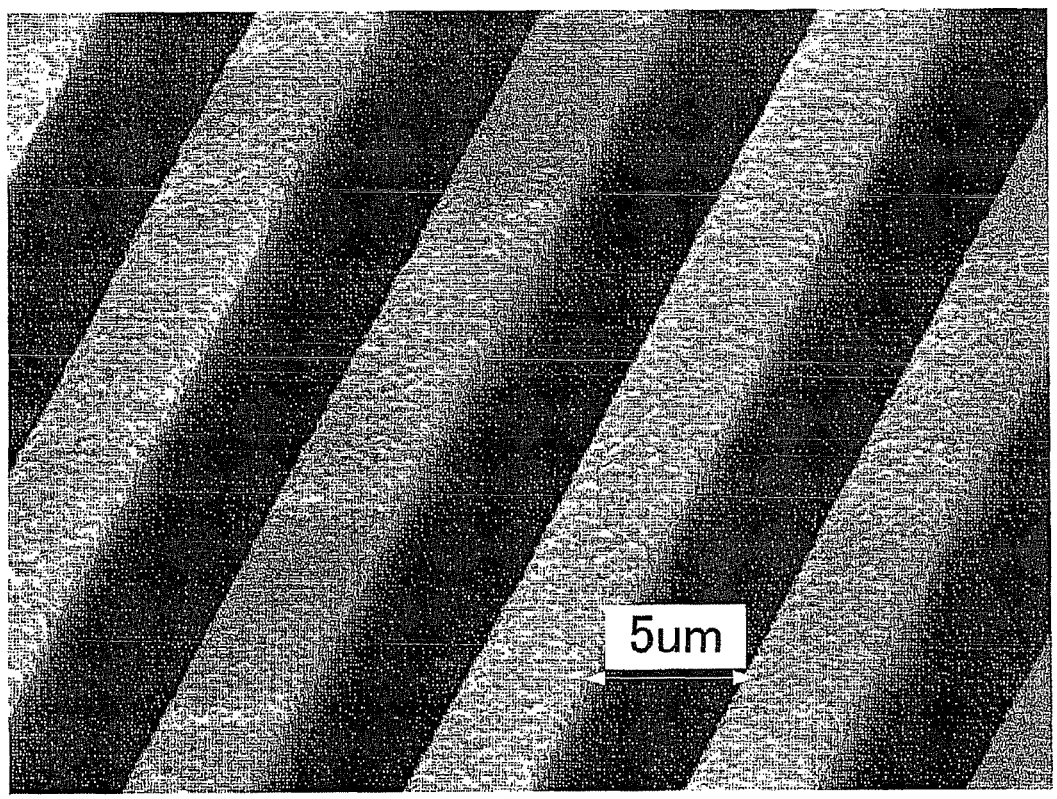
FIG. 10 is a photograph of a surface of "a structure having a plurality of straight line-like convex portions (three dimensional forming portions) which form straight line-like concave portions" manufactured by the manufacturing method according to the first embodiment of the present invention.

According to the present manufacturing method, it is possible to form a three dimensional forming portion having various shapes (convex portions having various shapes, that is, concave portions having various shapes when perceived differently) on the substrate. FIGS. 8-10 show photographs of the structures that were formed by sintering, the structures having "a plurality of dots (a plurality of cylindrical convex portions), a plurality of holes (a plurality of cylindrical concave portions), and a plurality of line-and-space (a plurality of straight line-like convex portions forming a plurality of straight line-like concave portions), respectively", according to the method of the first embodiment, each with a ceramic green sheet made of Zirconia, a slurry made of Zirconia, a commercially-supplied mold made of Silicon.

In the example shown in FIG. 8, a diameter of each of the dots (cylindrical convex portions) is 3.5 μm, a height of each of the dots is 7.8 μm, a distance between a center axis of one dot and a center axis of another dot adjacent to the one dot is 7.8 μm.

In the example shown in FIG. 9, a diameter of each of the holes (cylindrical concave portions) is 3.5 μm, a height (a depth) of each of the holes is 7.8 μm, a distance between a center axis of one hole and a center axis of another hole adjacent to the one hole is 7.8 μm.

In the example shown in FIG. 10, a width and a height of each of the lines (straight line-like convex portions) is 3.6 μm and 8.3 μm, respectively.

Figure 11:
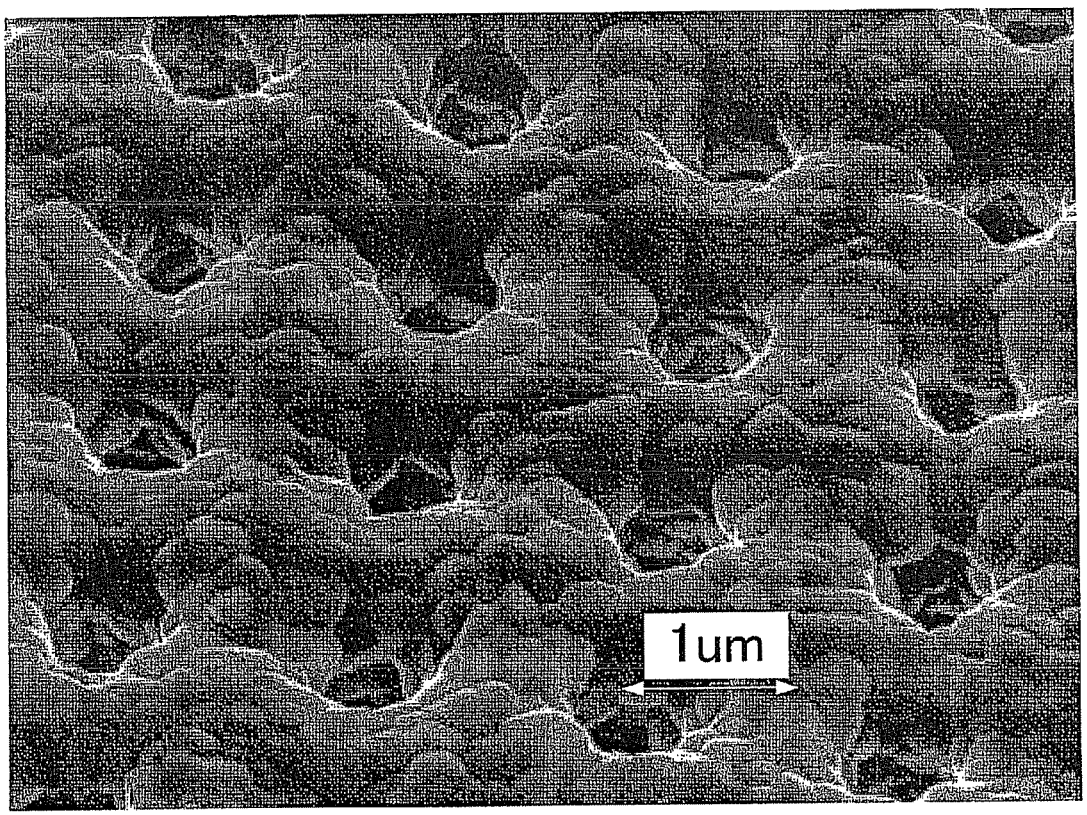
FIG. 11 is a photograph of a surface of "a structure of a three dimensional forming portion which forms cylindrical concave portions" manufactured by the manufacturing method according to the first embodiment of the present invention.
Figure 12:
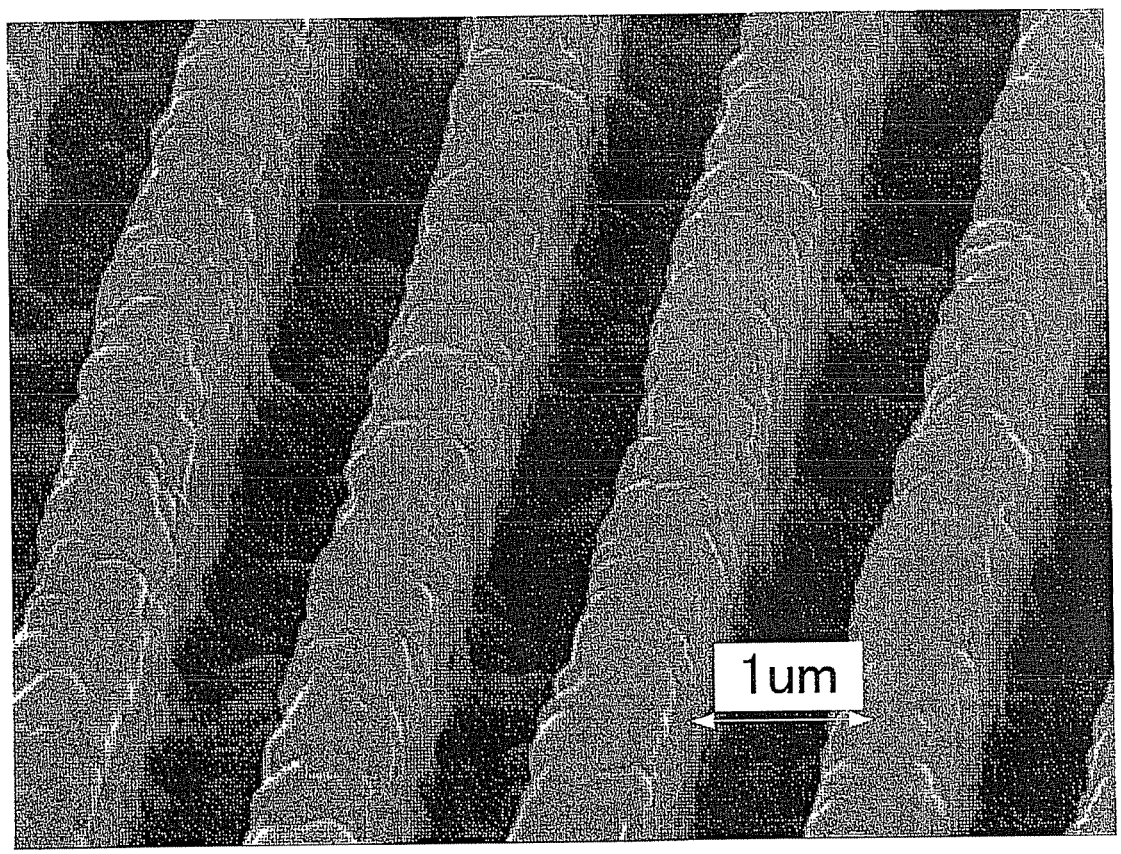
FIG. 12 is a photograph of a surface of "a structure having a plurality of straight line-like convex portions (three dimensional forming portions) which form straight line-like concave portions" manufactured by the manufacturing method according to the first embodiment of the present invention.

FIGS. 11 and 12 show photographs of the structures that were formed by sintering, the structures having "a plurality of holes (a plurality of cylindrical concave portions) and a plurality of line-and-space (a plurality of straight line-like convex portions forming a plurality of straight line-like concave portions), respectively", according to the method of the first embodiment, each with a ceramic green sheet made of Zirconia, a slurry made of Zirconia, a different commercially-supplied mold made of Silicon.

In the example shown in FIG. 12, a width and a height of each of the lines (straight line-like convex portions) is 0.8 μm and 1.4 μm, respectively. A distance between longitudinal center lines of a pair of lines adjacent to each other is 1.4 μm.

Figure 13:
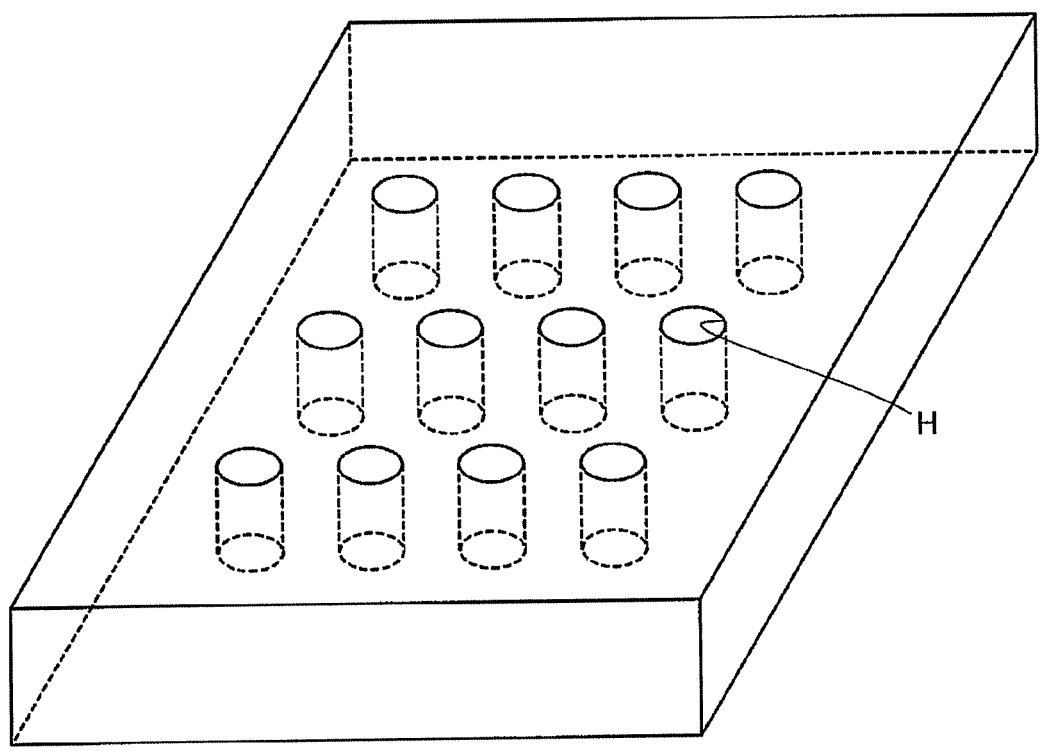
FIG. 13 is a schematic perspective view of a mold for manufacturing the three dimensional forming portion having the plurality of the cylindrical convex portions shown in FIG. 8.
Figure 14:
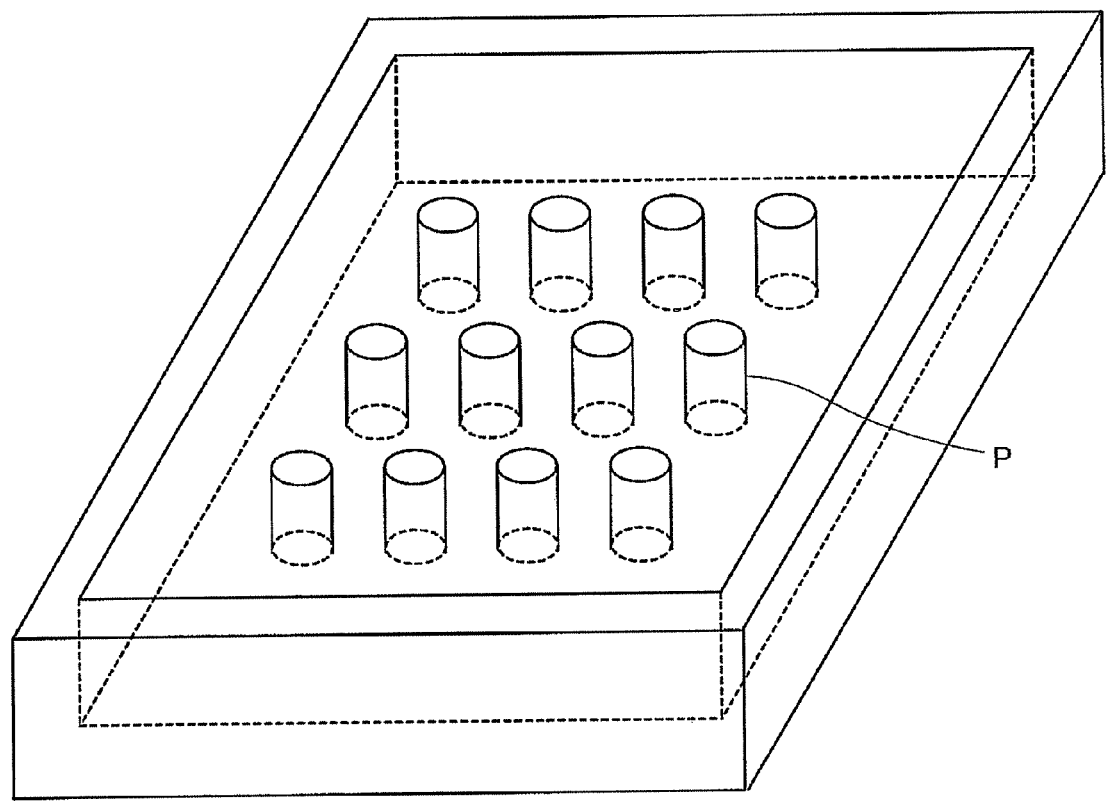
FIG. 14 is a schematic perspective view of a mold for manufacturing the three dimensional forming portion having the plurality of the cylindrical concave portions shown in FIGS. 9 and 11.

It should be noted that, for instance, the three dimensional forming portion having a plurality of the cylindrical convex potions shown in FIG. 8 is manufactured with "a mold having a plurality of cylindrical concave portions H" whose schematic perspective view is shown in FIG. 13. It should be also noted that each of the three dimensional forming portions having a plurality of the cylindrical concave potions shown in FIGS. 9 and 11 is manufactured with "a mold having a plurality of cylindrical convex portions P" whose schematic perspective view is shown in FIG. 14.

Second Embodiment

A method for manufacturing three dimensional forming portion according to a second embodiment of the present invention will next be described in order of steps. It should be noted that performing order of the following steps can be changed as long as there is no inconsistency.

(A Mold Preparation Step)

Figure 15:
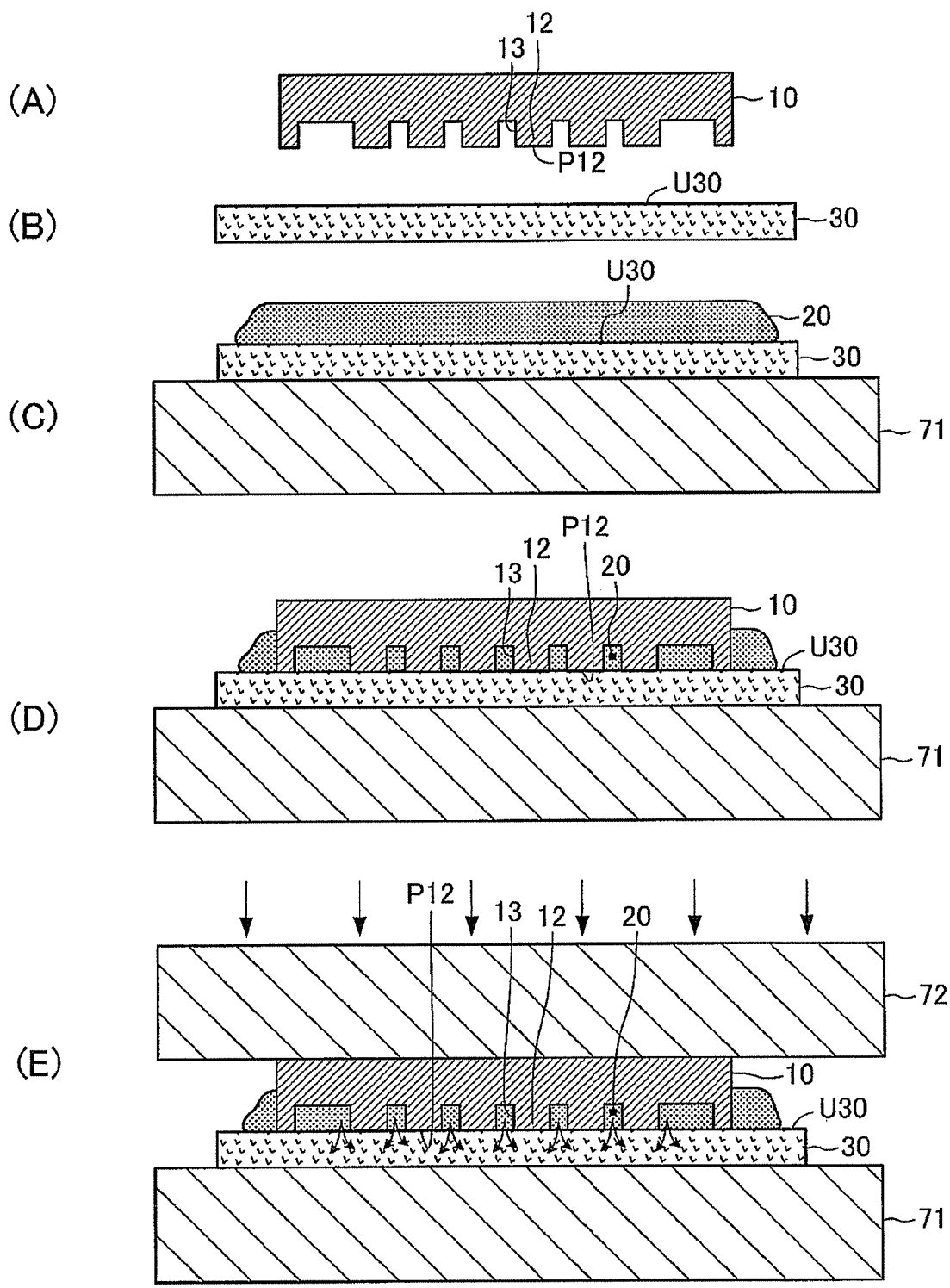
FIG. 15 is a figure to explain each of steps in a method for manufacturing a three dimensional forming portion according to a second embodiment of the present invention.

A mold 10 shown in (A) of FIG. 15 is prepared. This mold preparation step is the same as the mold preparation step described above.

(A Substrate Preparation Step)

A ceramic green sheet 30 shown in (B) of FIG. 15 is prepared. This substrate preparation step is also the same as the substrate preparation step described above.

(A Slurry Preparation Step)

A slurry 20 shown in (C) of FIG. 15 is prepared. This slurry preparation step is also the same as the slurry preparation step described above.

(A Pre-Dried Three Dimensional Forming Portion Forming Step)

Subsequently, as shown in (C) of FIG. 15, the ceramic green sheet 30 is placed on a lower plate 71 of a lamination machine. The lower plate 71 of the lamination machine generates heat upon energization.

Next, the slurry 20 is formed in the form of a layer (in the form of a film having a substantially constant thickness) on an upper side (one surface side) U30 of the ceramic green sheet 30. This step is called a slurry layer forming step. Thereafter, as shown in (D) of FIG. 15, the mold 10 is placed in such a manner that "a side at which the concave portions 13 are formed, of the mold 10 (i.e., an end face P12)" opposes to "one surface side (an upper side) U30 of the ceramic green sheet 30".

Subsequently, as shown in (E) of FIG. 15, an upper plate 72 of the lamination machine is placed on the other side at which the concave portions 13 are not formed, of the mold 10 (i.e., the other end face opposing to the end face P12). The upper plate 72 of the lamination machine also generates heat upon energization. In this state, a load is applied to the upper plate 72 of the lamination machine to press the mold to the ceramic green sheet 30. Simultaneously, the ceramic green sheet 30 is heated by heat generated by the lower plate 71 and the upper plate 72. This step is also called "a pressing step". It should be noted that "the end faces P12 of concave portion forming side" of the mold 10 contacts the upper side U30 of the ceramic green sheet 30 in this example. However, the mold 10 may be placed in such a manner that the end surface of concave portion forming side P12 is slightly apart from "the upper side U30 of the ceramic green sheet 30" by a slight distance.

(A Post-Dried Three Dimensional Forming Portion Forming Step)

The state (the pressing step) shown in (E) of FIG. 15 is kept for a predetermined time period. As a result, the solvent included in "the slurry 20 kept in the concave portions 13 of the mold" is permeated (or passed through) the fine pores of the ceramic green sheet 30 by "its own weight, capillarity, and the pressing force given by pressing the mold 10, etc.". Thus, the slurry 20 is dried to be solidified. As a result, "a post-dried three dimensional forming portion" is formed within the concave portions 13 and on the one side (in this case, at the upper side U30) of the ceramic green sheet 30. When the slurry 20 has dried, and therefore, "the post-dried three dimensional forming portion" has been formed, "the ceramic green sheet 30 and the post-dried three dimensional forming portion" are cooled. Then, the mold 10 is released (removed) from "the ceramic green sheet 30 and the post-dried three dimensional forming portion". That is, a demolding step is performed.

(A Laminating Step and a Sintering Step)

Subsequently, similarly to the first embodiment, another ceramic green sheet is laminated on "the post-dried three dimensional forming portion", and thereafter, the laminated body is sintered to be integrated. It should be noted that the laminating step can be omitted.

As described above, by the method for manufacturing a three dimensional forming portion according to the second embodiment of the present invention, "the mold 10 which is in the state where the concave portions 13 is filled with the slurry 20" is pressed against the ceramic green sheet 30 while the mold 10 is being heated by the lower plate 71 and the upper plate 72 of the lamination machine. Accordingly, an adherence between the slurry 20 and the ceramic green sheet 30 can be increased. As a result, "a deformation of the post-dried three dimensional forming portion (breaking the pattern)" can be avoided, while demolding.

As described above, the methods for forming a three-dimensional forming portion according to each of the embodiments of the present invention, the three-dimensional forming portion having the fine pattern (which is the shape in front view) can be formed on the porous substrate. It should be noted that the present invention is not limited to the above-described embodiments, and various modifications can be employed within the scope of the present invention.

For example, the ceramic powders are used for the slurry 20 of each of the embodiments as the particles of the main raw material, however, the particles of the main raw material may be replaced by "powders of electrical conducting materials, such as metal powders". With this, electrical circuit patterns and so on can be formed on the substrate.

Further, for example, "the another ceramic green sheet 31" used in the laminating step may be a green sheet having another three dimensional forming portion that is formed separately. Furthermore, a multiple layered and pre-sintered laminated body may be formed by laminating one or more of different ceramic green sheets on the structure, and such a pre-sintered laminated body may be sintered.

Figure 16:
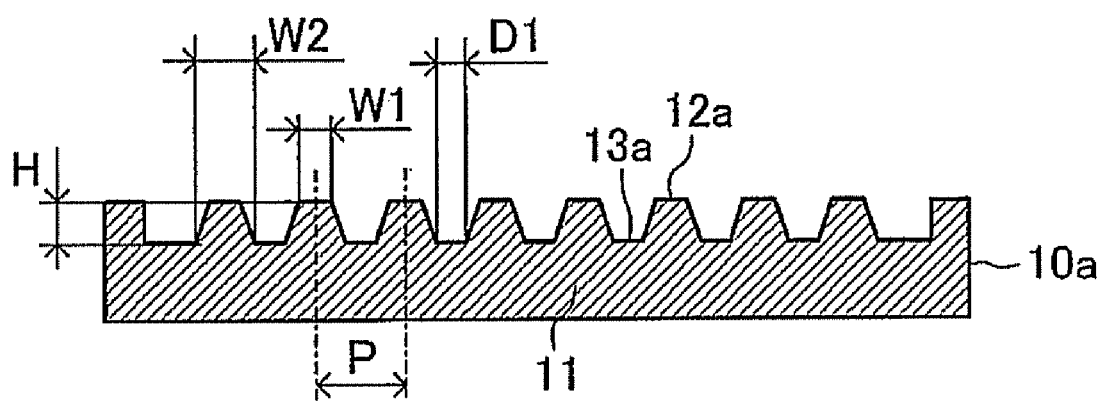
FIG. 16 is a cross sectional view of a mold used in the methods for manufacturing a three dimensional forming portion according to the first and the second embodiment of the present invention.
Figure 17:
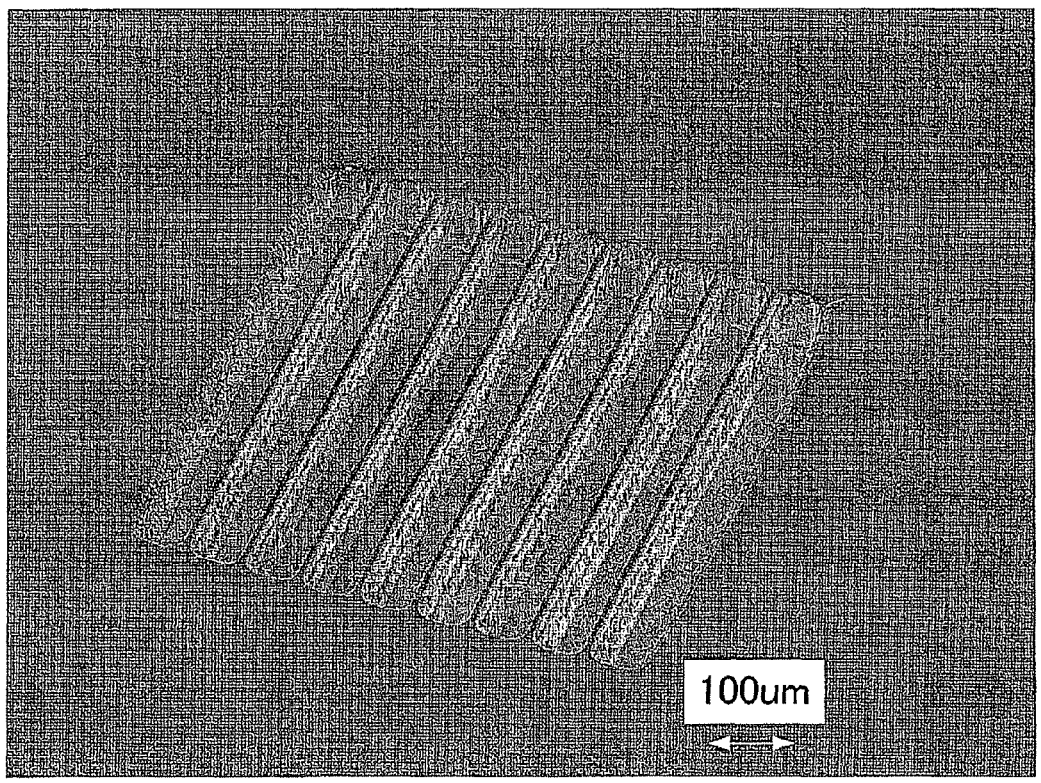
FIG. 17 is a photograph of a surface of a structure manufactured using the mold shown in FIG. 16 according to the first embodiment of the present invention.

In addition, as shown in FIG. 16, the mold 10 may have a shape comprising a plurality of convex portions 12a, each of which has a trapezoidal shape in cross section, on the base 11. In such a case, each of concave portions 13a has an inverted trapezoidal shape. In the example shown in FIG. 16, a width W1 of an upper base of each of the convex portions 12a is 50 μm, a width W2 of an lower base of each of the convex portions 12a is 70 μm, a height H of each of the convex portions 12a is 100 μm, and a distance P between centerlines of a pair of the convex portions 12a, 12a adjacent to each other is 90 μm. A minimum width D1 of each of the concave portions 13a is 20 μm. A length along a longitudinal direction of the convex portion 12a and the concave portion 13a is 870 μm. Preferably, the width W1 is 10-80 μm, the height H is 0-200 μm, and the P is 60-120 μm. These dimensions are just exemplary and not limited to them. FIG. 10 shows a magnified photograph of a structure actually formed with using this mold 10a.

Figure 18:
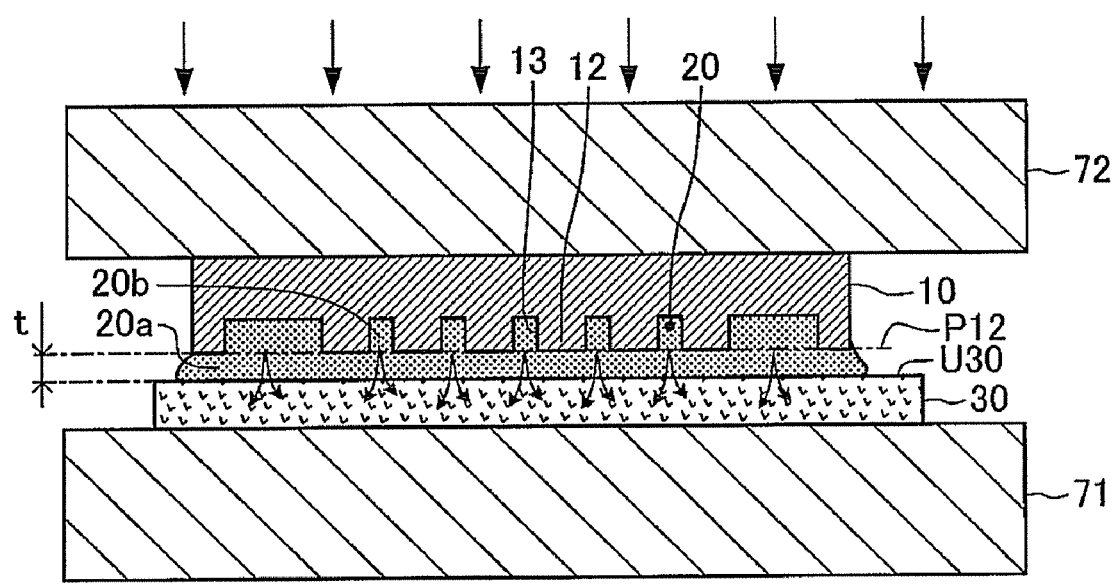
FIG. 18 is a figure to explain a pre-dried three dimensional forming portion forming step and a post-dried three dimensional forming portion forming step in a method for manufacturing a three dimensional forming portion according to a modified embodiment of the present invention.

Moreover, as described above and as shown in FIG. 18, in "the pre-dried three dimensional forming portion forming step" and "the post-dried three dimensional forming portion forming step" according to each of the embodiments of the present invention, the mold 10 may be placed at the upper side (at the one surface side) U30 of the ceramic green sheet 30 in such a manner that the end surface P12 of concave portion forming side of the mold 10 (i.e., top end surface of the convex portion 12) is parallel to and is slightly apart from "the upper side U30 of the ceramic green sheet 30" by a short distance t. With this, "a plate-like portion 20a whose thickness is t" is formed on the ceramic green sheet 30, and "the three dimensional forming portion 20b" having a shape following the predetermined pattern is formed on the plate-like portion 20a.

Figure 19:
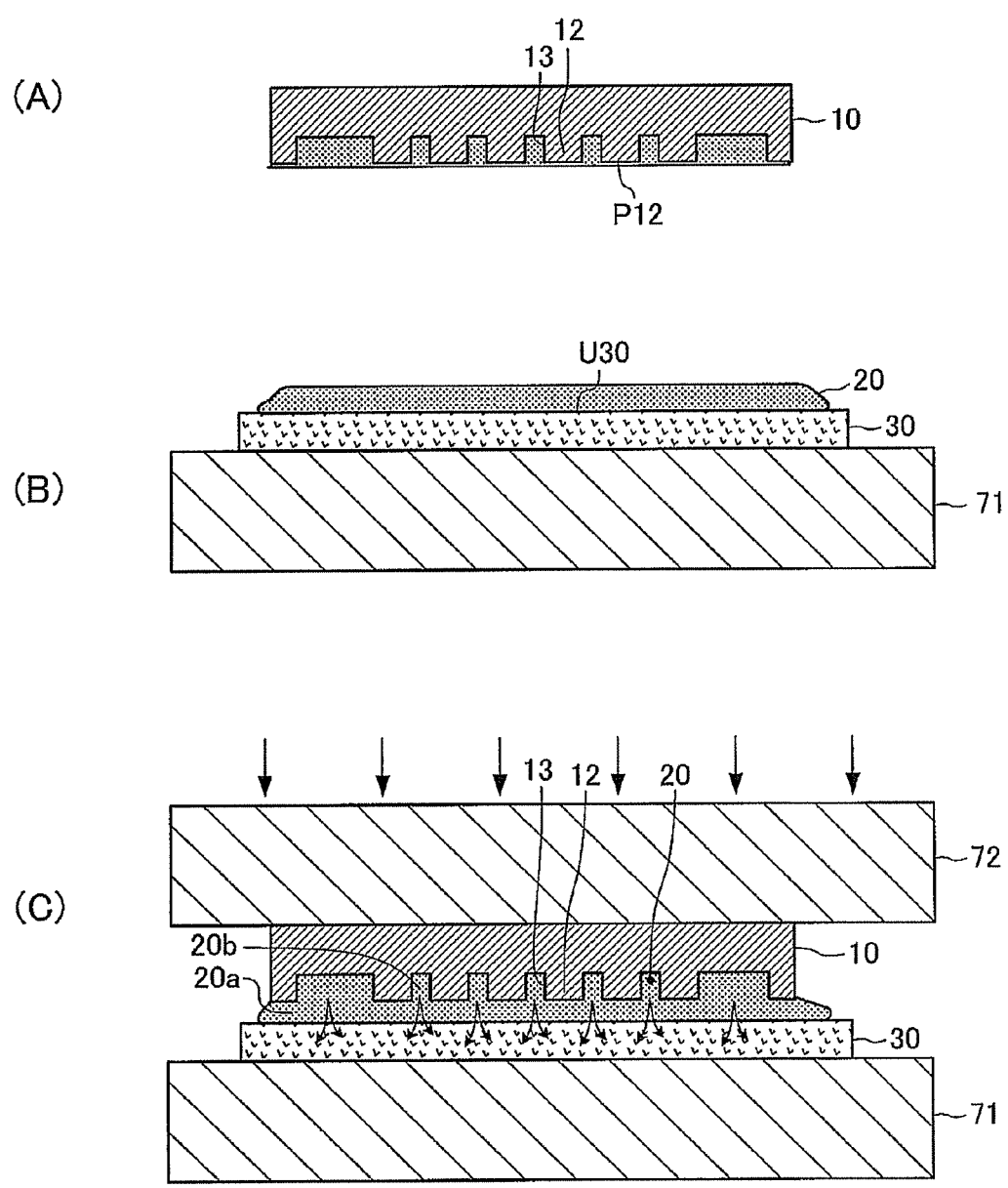
FIG. 19 is a figure to explain a pre-dried three dimensional forming portion forming step and a post-dried three dimensional forming portion forming step in a method for manufacturing a three dimensional forming portion according to another modified embodiment of the present invention.

In this case, as shown in (A) of FIG. 19, the slurry 20 is filled into the concave portions 13 of the mold 10, and as shown in (B) of FIG. 19, the slurry 20 is formed on the upper side (the one surface side) U30 of the ceramic green sheet 30 in the form of layer. Subsequently, as shown in (C) of FIG. 19, the mold 10 with which the slurry 20 is filled is pressed toward the slurry 20 formed on the upper side U30 of the ceramic green sheet 30. In other words, for instance, in the pre-dried three dimensional forming portion forming step of the first embodiment, the slurry 20 may be formed on the upper side U30 of the ceramic green sheet 30 in the form of layer, just like in the pre-dried three dimensional forming portion forming step of the second embodiment, and thereafter, the mold 10 may be placed in such a manner that the side P12 at which the concave portions 13 are formed opposes to the upper side U30 of the ceramic green sheet 30. In this case, it is preferable that the pressing load toward the upper side U30 of the ceramic green sheet 30 be applied to the mold 10.

The mold 10 is provided with "frame portion 14 which protrudes from the base 11 and is higher than the convex portions 12 (e.g., see FIG. 1)" at entire (outer) circumference of the mold 10. With this structure, the slurry 20 may be filled into the concave portions 13 more efficiently and more certainly.

Further, in the above embodiments, the mold 10 is placed upward in the vertical direction from the ceramic green sheet 30, however, the mold may be placed downward in the vertical direction from the ceramic green sheet 30. In other words, the mold 10 is placed against the ceramic green sheet 30 in such a manner that the end surface of concave portion forming side P12 of the mold 10 opposes to lower surface (i.e., a side opposite to upper side U30) of the ceramic green sheet 30. In such a case, the solvent included in the slurry 20 is permeated into the ceramic green sheet 30 by capillarity action. In addition, in such a case, by driving vacuum pump to keep a pressure in the ceramic green sheet 30 lower than the atmospheric pressure, the solvent included in the slurry 20 can be permeated into or sucked into the fine pores of the ceramic green sheet 30 more efficiently. As described, in the present specification and in the claims, "an upper side (upper section side) of the porous substrate" may mean "the one surface side of the pair of surfaces of the porous substrate", and does not necessarily mean "upward side in the vertical direction", but include "downward side in the vertical direction".

The invention claimed is:

1. A method for forming a three-dimensional forming portion comprising:
    a mold preparation step of preparing a mold having a concave portion which has a predetermined shape in a front view;
    a slurry preparation step of preparing a slurry including particles of a main raw material, a solvent for said particles, and an organic material;
    a substrate preparation step of preparing a porous substrate through which gases can pass, said porous substrate being at least one of a ceramic green sheet, a porous ceramic substrate, a porous film and a paper;
    a pre-dried three dimensional forming portion forming step of placing said slurry in said mold and positioning said mold on one surface side of said porous substrate in such a manner that a pre-dried three dimensional forming portion of said slurry which has a shape following said predetermined mold shape is formed on said one surface side of the porous substrate by means of said concave portion of said mold; and
    a post-dried three dimensional forming portion forming step of having said solvent included in said slurry permeate into fine pores of said porous substrate while said mold is kept on said one surface side of the porous substrate to dry said pre-dried three dimensional forming portion so as to form a post-dried three dimensional forming portion including:
    placing said porous substrate on a porous sintered support,
    wherein said porous substrate contacts said porous sintered support only on a porous substrate surface side that is opposite to said one porous substrate surface side contacting said slurry, and
    wherein an inside pressure within said porous substrate is reduced to a pressure lower than atmospheric pressure, via a suction force applied through said porous sintered support and said directly opposite porous substrate side, whereby said solvent permeates into said fine pores of said porous substrate.

2. A method for forming a three-dimensional forming portion according to claim 1, wherein said porous substrate is a ceramic green sheet, and said particles of said main raw material are ceramic powders, the method further comprising;
    a sintering step of sintering and integrating said porous substrate and said post-dried three dimensional forming portion after said post-dried three dimensional forming portion forming step.

3. A method for forming a three-dimensional forming portion according to claim 2, wherein
    said particles from which said ceramic green sheet is formed and said particles of said main raw material are the same kind of ceramic.

4. A method for forming a three-dimensional forming portion according to claim 2, further comprising:
    a laminating step of forming a pre-sintered structure having a hollow portion, after said post-dried three dimensional forming portion forming step and before said sintering step, by placing another ceramic green sheet on said post-dried three dimensional forming portion; and wherein
    said sintering step is a step of sintering and integrating said pre-sintered structure.

5. A method for forming a three-dimensional forming portion according to claim 3, further comprising:
    a laminating step of forming a pre-sintered structure having a hollow portion, after said post-dried three dimensional forming portion forming step and before said sintering step, by placing another ceramic green sheet on said post-dried three dimensional forming portion; and wherein
    said sintering step is a step of sintering and integrating said pre-sintered structure.

6. A method for forming a three-dimensional forming portion according to claim 1, wherein
    said pre-dried three dimensional forming portion forming step includes a concave portion slurry filling step of filling said slurry into said concave portion of said mold, and is a step of forming said pre-dried three dimensional forming portion by placing said mold, after said slurry is filled into said concave portion, in such a manner that a side at which said concave portion is formed opposes to said one surface side of said porous substrate; and
    said post-dried three dimensional forming portion forming step includes a demolding step of releasing said mold from said post-dried three dimensional forming portion.

7. A method for forming a three-dimensional forming portion according to claim 1, wherein
    said pre-dried three dimensional forming portion forming step includes a pressing step of forming said slurry on said one surface side of said porous substrate in the form of layer, placing said mold in such a manner that a side at which said concave portion is formed opposes to said one surface side of said porous substrate, and thereafter pressing said mold toward said porous substrate; and said post-dried three dimensional forming portion forming step includes a demolding step of releasing said mold from said post-dried three dimensional forming portion.

8. A method for forming a three-dimensional forming portion according to claim 1, wherein
said pre-dried three dimensional forming portion forming step includes, a concave portion slurry filling step of filling said slurry into said concave portion of said mold; and
a slurry layer forming step of forming said slurry on said one surface side of said porous substrate in the form of layer;
and is a step of forming said pre-dried three dimensional forming portion by placing said mold in such a manner that a side at which said concave portion is formed opposes to said one surface side of said porous substrate, after said slurry is filled into said concave portion and said slurry is formed on said one surface side of said porous substrate in the form of layer; and
said post-dried three dimensional forming portion forming step includes a demolding step of releasing said mold from said post-dried three dimensional forming portion.

9. A method for forming a three-dimensional forming portion according to claim 1, wherein
said post-dried three dimensional forming portion forming step includes assisting in drying said three-dimensional forming portion by evaporating said solvent through heating at least one portion of said porous substrate.

* * * * *